United States Patent
Bedard et al.

(10) Patent No.: US 11,336,073 B2
(45) Date of Patent: May 17, 2022

(54) BRILLOUIN DYNAMIC GRATING GENERATION USING DUAL-BRILLOUIN-PEAK OPTICAL FIBER

(71) Applicant: OFS FITEL, LLC, Norcross, GA (US)

(72) Inventors: Kyle R Bedard, Warrren, MA (US); Jie Li, Unionville, CT (US); Xiaoguang Sun, West Hartford, CT (US); Man F Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 69 days.

(21) Appl. No.: 16/699,278

(22) Filed: Nov. 29, 2019

(65) Prior Publication Data

US 2020/0176947 A1  Jun. 4, 2020

Related U.S. Application Data

(60) Provisional application No. 62/772,763, filed on Nov. 29, 2018.

(51) Int. Cl.
*H01S 3/30* (2006.01)
*G02B 6/02* (2006.01)

(52) U.S. Cl.
CPC .......... *H01S 3/302* (2013.01); *G02B 6/02214* (2013.01); *G02B 6/02076* (2013.01)

(58) Field of Classification Search
None
See application file for complete search history.

(56) References Cited

U.S. PATENT DOCUMENTS

| | | | |
|---|---|---|---|
| 7,272,160 B1* | 9/2007 | Geng | H01S 3/302 372/29.011 |
| 10,401,563 B2 | 9/2019 | Bedard et al. | |
| 2005/0105165 A1* | 5/2005 | Emori | H04B 10/2916 359/334 |
| 2005/0163443 A1* | 7/2005 | Antos | G02B 6/03622 385/123 |
| 2013/0216176 A1* | 8/2013 | Li | G01L 1/246 385/12 |

* cited by examiner

*Primary Examiner* — Chad H Smith (57) ABSTRACT

Disclosed herein is a method comprising injecting light of a first wavelength $\lambda_1$ into a wavelength division multiplexer; injecting light of a second wavelength $\lambda_2$ into the wavelength division multiplexer; combining the light of the first wavelength $\lambda_1$ and the light of the second wavelength $\lambda_2$ in the wavelength division multiplexer to produce light of a third wavelength $\lambda_3$; and reflecting the light of the third wavelength $\lambda_3$ in a dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects an improved back-reflected Brillouin signal of the combined light.

20 Claims, 4 Drawing Sheets

BRILLOUIN DYNAMIC GRATING GENERATION USING DUAL-BRILLOUIN-PEAK OPTICAL FIBER

This disclosure relates to generating a Brillouin dynamic grating using dual-Brillouin-peak optical fibers. This application claims the benefit of U.S. Provisional Application No. 62/772,763, filed Nov. 29, 2018 and herein incorporated by reference.

BACKGROUND

Figure 1:
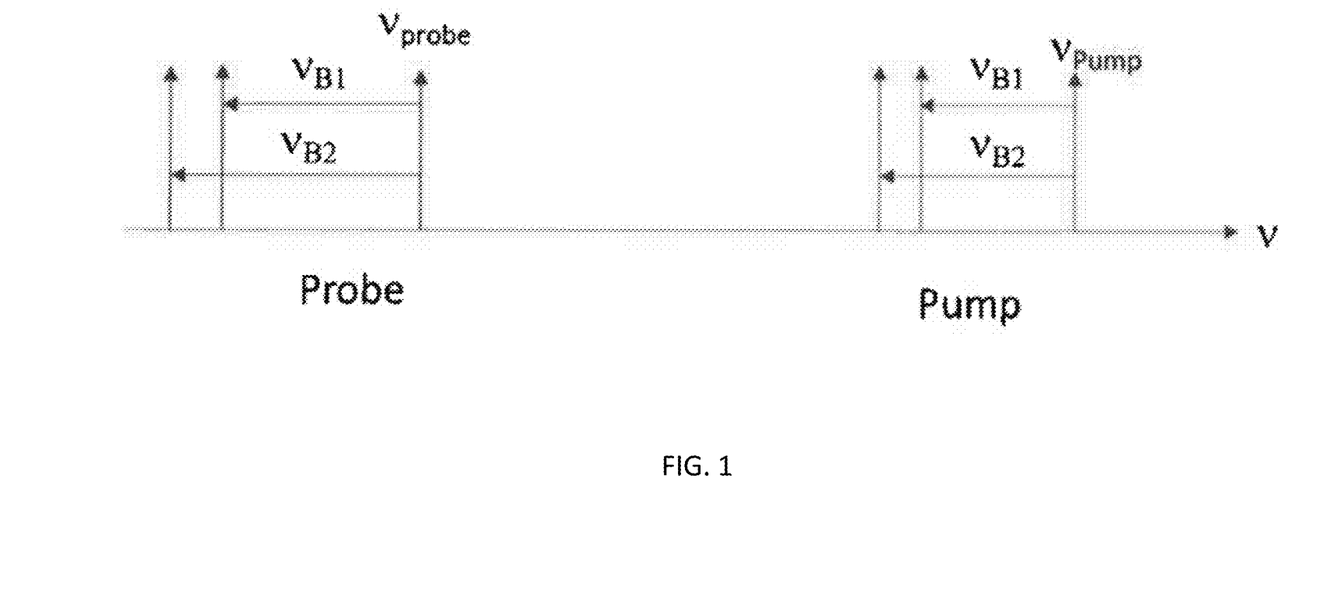
FIG. 1 is an exemplary depiction of the principle of the Brillouin diffraction grating operation in the dual-Brillouin-peak optical fiber

Brillouin scattering is the interaction between light and sound waves in the matter. The propagating light beam in the fiber generates a propagating sound wave, which creates a periodic variation of the fiber refractive index. This generates a Fiber Bragg Grating that backscatters the light through Bragg diffraction process. The back scattered wave, called a "Stokes wave" is down-shifted by about 10 gigahertz (GHz) with regard to the incident wave frequency. This is shown in the FIG. 1. In the FIG. 1, incident light having a frequency $\omega$ is incident upon a material. The incident light generates a propagating sound wave having a frequency $\Omega$ and sets up an index grating. The back scattered light has a frequency of $\omega-\Omega$.

When increasing the launched power of the optical beam, the reflected power increases linearly due to back Rayleigh scattering effect in the fiber. Above a given threshold, the reflected power increases exponentially due to the stimulated Brillouin scattering effect.

Brillouin dynamic gratings (BDGs) can be generated by stimulated Brillouin scattering (SBS) and have been demonstrated in polarization maintaining (PM) optical fibers and few-mode (FM) optical fibers. BDGs can greatly increase the received Brillouin signal and thus improve the spatial resolution and sensitivity in distributed temperature and strain sensing in optical fiber. Using PM or FM fiber to generate Brillouin dynamic gratings requires the use of equipment such as polarization or mode coupler/splitters, which are expensive. The use of polarization or mode coupler/splitters degrade the signals because of coupling between the modes. It is therefore desirable to generate Brillouin dynamic gratings without the use of polarization or mode coupler and/or splitters.

SUMMARY

Disclosed herein is a method comprising injecting light of a first wavelength $\lambda_1$ into a wavelength division multiplexer; injecting light of a second wavelength $\lambda_2$ into the wavelength division multiplexer; combining the light of the first wavelength $\lambda_1$ and the light of the second wavelength $\lambda_2$ in the wavelength division multiplexer to produce light of a third wavelength $\lambda_3$; and reflecting the light of the third wavelength $\lambda_3$ in a dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects an improved back-reflected Brillouin signal of the combined light.

Disclosed herein too is an apparatus comprising a first source of light having a first wavelength $\lambda_1$; a second source of light having a second wavelength $\lambda_2$; wherein $\lambda_2$ is different from $\lambda_1$; a wavelength divisional multiplexer that is operative to combine light received from the first source of light and from the second source; wherein the combined light has a third wavelength $\lambda_3$ that is different from first wavelength $\lambda_1$ and the second wavelength $\lambda_2$; and ra dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects an improved back-reflected Brillouin signal of the combined light.

DETAILED DESCRIPTION

Disclosed herein is a method that comprises using a Brillouin-peak optical fiber (that displays two or more peaks having substantially similar intensities) (hereinafter a dual-Brillouin peak optical fiber) to generate a Brillouin dynamic grating that enables the production of an improved back-reflected Brillouin signal when compared with an optical fiber that is not a Brillouin-peak optical fiber. Disclosed herein too is an apparatus that generates a Brillouin dynamic grating with an improved back-reflected using a first light beam and a second light beam of different wavelengths. The two light beams are coupled via a wavelength division multiplexer that is in operative communication with the dual-Brillouin peak optical fiber. Since the two beams have a high overlap, the Brillouin diffraction grating produces a large amount of reflection.

Brillouin scattering is an effect caused by the nonlinearity of a medium, specifically by that part of the nonlinearity which is related to acoustic phonons. An incident photon can be converted into a scattered photon of slightly lower energy, usually propagating in the backward direction, and a phonon. The coupling of optical fields and acoustic waves occurs via electrostriction. The effect can occur spontaneously even at low optical powers, then reflecting the thermally generated phonon field. For higher optical powers, there can be a stimulated effect, where the optical fields substantially contribute to the phonon population. Above a certain threshold power of a light beam in a medium, the stimulated Brillouin scattering can reflect most of the power of an incident beam. This process involves a strong nonlinear optical gain for the back-reflected wave. Thus, an originally weak counter-propagating wave at the suitable optical frequency can be strongly amplified. Here, the two counter-propagating waves generate a traveling refractive index grating; the higher the reflected power, the stronger the index grating and the higher the effective reflectance.

The frequency of the reflected beam is slightly lower than that of the incident beam. The frequency difference $v_B$ corresponds to the frequency of emitted phonons. This so-called Brillouin frequency shift is set by a phase-matching requirement. For pure backward Brillouin scattering, the Brillouin shift can be calculated from the refractive index n, the acoustic velocity $v_a$, and the vacuum wavelength $\lambda$ as seen in Formula (1)

$$v_B = \frac{2nv_a}{\lambda} \qquad (1)$$

In optical fibers, Brillouin scattering occurs essentially only in backward direction. However, rather weak forward Brillouin scattering is also possible due to effects of the acoustic waveguide. The Brillouin frequency shift depends on the material composition and to some extent the temperature and pressure of the medium. Such dependencies are exploited for fiber-optic sensors.

In an embodiment, a Brillouin diffraction grating can be generated at multiple frequencies using a dual-Brillouin peak optical fiber. The Brillouin dynamic gratings generated by stimulated Brillouin scattering using a dual-Brillouin peak optical fiber can be used to reflect a probe signal at a different wavelength, different from that of a pump used to inject laser light into the dual-Brillouin peak optical fiber. To meet the phase matching condition, one of the Brillouin frequency shifts (BFS) of the pump signal must match one of the other BFSs of the probe beam. The probe beam is the reflected signal from the laser light from that injected by the pump. For example in the Formula (2)

$$v_{B,pump\_1} = v_{B,probe\_2} \qquad (2),$$

where $v_{B,pump\_1}$ corresponds to the first peak of the BFS of the injected pump laser light and $v_{B,probe\_2}$ corresponds to the second peak of the probe light's BFS.

Then the back scattered Brillouin signal of the probe light can be enhanced by the BDG. The illustration of principle of the Brillouin diffraction grating operation in the dual-Brillouin-peak optical fiber is shown in the FIG. 1. In the FIG. 1, $v_{B,pump\_1}$ corresponds to the first peak of the BFSs of the pump, $v_{B,pump\_2}$ corresponds to the second peak of the BFSs of the pump $v_{B,probe\_1}$ corresponds to the first peak of the BFSs of the probe, $v_{B,pump\_2}$ corresponds to the second peak of the BFSs of the probe. Thus by matching the probe frequency (or wavelength) to the pump frequency (or wavelength) as indicated in the Formula 2 the reflection by the Brillouin scattering can be increased.

As noted above, the dual-Brillouin peak optical fiber (that displays two or more peaks having similar intensities) may be used to generate a Brillouin dynamic grating. In an embodiment, it is preferable to use a dual-Brillouin peak optical fiber that produces reflected Brillouin signal peak intensities that are comparable in magnitude. Comparable peak intensities between the primary scattering peak and the scattering intensities of one of the other peaks (the secondary, the tertiary, the quarternary peak, and the like) can be achieved by increasing the overlap of fundamental optical mode with the higher acoustic modes.

Figure 2:
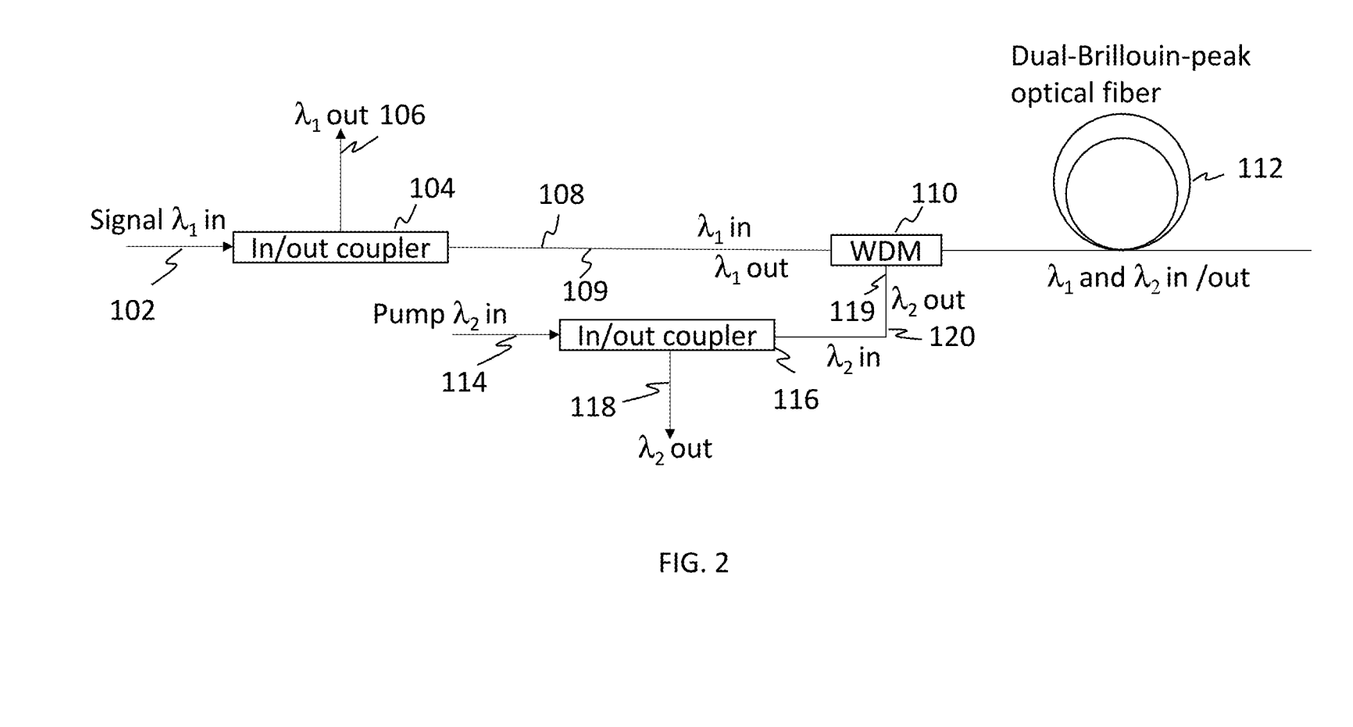
FIG. 2 is an exemplary schematic diagram of the apparatus that produces an improved reflection using a Brillouin diffraction grating.

With reference now to the FIG. 2, the apparatus 100 comprises a first source 102 of light referred to herein as a probe and a second source 104 of light referred to herein as a pump. The first source 102 of light has a first wavelength $\lambda_1$ while the second source of light 118 has a second wavelength $\lambda_2$. In an embodiment, the first wavelength $\lambda_1$ is different from the second wavelength $\lambda_2$. The first source 102 and the second source 118 are preferably laser sources of light. The beam emitted from the laser may be continuous or pulsed. The light wavelength may vary from 400 to 2100 nanometers, preferably 600 to 1800 nanometers, and more preferably 1300 to 1600 nanometers. A preferred wavelength (for deriving the Brillouin scattering peaks because of an interaction of the fundamental optical mode with several acoustic modes) is 1550 nanometers.

The first source 102 injects light having the first wavelength $\lambda_1$ into a first optical coupler 104 while the second source 118 injects light having the second wavelength $\lambda_2$ into a second optical coupler 116. The wavelength ratio of the first wavelength $\lambda_1$ to the second wavelength $\lambda_2$ is proportional to the Brillouin frequency shifts of a first peak $v_{B,1}$ and a second peak $v_{B,2}$ respectively in the Brillouin spectrum. This is shown in the Equation (3) below:

$$\frac{\lambda_2}{\lambda_1} \sim = \frac{v_{B,2}}{v_{B,1}} \qquad (3)$$

where the terms have the meanings detailed above. The light emanating from the first optical coupler 104 and the second optical coupler 116 then travels through optical fibers 108 and 120 respectively to a wavelength division multiplier (WDM) 110 which is in communication with the dual-Brillouin peak optical fiber 112. The dual-Brillouin peak optical fiber 112 generates a Brillouin dynamic grating that enables the production of an improved back-reflected Brillouin signal.

The fiber optic couplers 104 and 116 are optical devices capable of connecting one or more fiber ends in order to allow the transmission of light waves in multiple paths. In an embodiment, the first optical coupler is a T coupler or an X coupler, while the second optical coupler is also a T coupler or an X coupler. In a preferred embodiment, the first optical coupler 104 and the second optical coupler 116 are T couplers that have an uneven distribution. The power of one output signal is greater than the other output signal. Popular splitting ratios may range from 90% to 99%:10% to 1%.

In an embodiment, the first optical coupler (an optical circulator or coupler) 104 couples the incident light from 102 into 108 and couples light from 109 to 106; the second optical coupler 116 couples the incident light from 114 into 119 and couples light from 120 to 118. The second light streams 108 and 119 are transmitted to the WDM 110 via single mode or few mode (FM) optical fibers.

Both light streams 108 and 120 are fed into the WDM 110, where the streams are joined together. In an embodiment, the WDM 110 may use a multiplexer to join the streams 108 and 120 together and may use a demultiplexer to split them apart. The WDM is preferably a device that does both simultaneously (i.e., joins light streams and splits them apart) and can function as an optical add-drop multiplexer. In an embodiment, the WDM is operative to combine light received from the first source of light and from the second source. The combined light stream of the wavelength $\lambda_1$ and $\lambda_2$ is then transmitted to the dual-Brillouin peak optical fiber. The back reflected light from 112 will be also split by WDM 110 to 109 and 120 by wavelength $\lambda_1$ and $\lambda_2$ As noted above, the WDM 110 is in communication with a dual-Brillouin peak optical fiber 112 that generates a Brillouin dynamic grating. The Brillouin dynamic grating enables the production of an improved back-reflected Brillouin signal. In an embodiment, the dual-Brillouin peak optical fiber 112 has at least two Brillouin peaks, such that the amplitude $A_1$ of at least one of said Brillouin peaks is within 50% to 150% of the amplitude $A_2$ of another Brillouin peak $0.5 A_2 \leq A_1 \leq 1.5 A_2$.

In an embodiment, the dual-Brillouin peak optical fiber 112 has a Brillouin gain spectrum that has multiple peaks with at least two of the peaks having similar intensities. Using a dual-Brillouin-peak optical fiber, the back scattered Brillouin light has multiple peaks and the peak frequencies corresponding to the Brillouin frequency shifts (BFSs) vs can be calculated by the Equation shown in Formula (3):

$$v_{B,i} = 2 \cdot \frac{V_{clad}}{\lambda} \frac{n_{oeff}}{n_{aeff,i}} \quad i = 1, 2.. \text{corespoding to peak 1, 2..} \quad (3)$$

where $\lambda$ is the optical wavelength; $n_o(r)$ is the optical refractive index of the fiber; $n_{oeff}$ is the effective refractive index of the optical $LP_{01}$ mode; $n_a(r)$ is the longitudinal acoustic refractive index of the fiber; $n_{oeff}$ is the effective longitudinal refractive index of the acoustic modes, $V_{clad}$ is the longitudinal acoustic velocity in silica cladding, where $V_{clad}$=5944 m/s.

The use of the dual-Brillouin-peak optical fiber 112 (with a Brillouin gain spectrum that has multiple peaks with at least two of the peaks having similar intensities) produces a reflection of the incident light beam (which is a combination of light streams 108 and 120) emanating from the WDM 110. The reflected beam emanating from the dual-Brillouin-peak optical fiber 112 is transmitted to the WDM where it is split by the demultiplexer to form a first reflected light stream 109 having a first reflected wavelength $\lambda_{1'}$ and a second reflected light stream 119 having a second reflected wavelength $\lambda_{2'}$. In an embodiment, the first reflected wavelength $\lambda_{1'}$ and the second reflected wavelength $\lambda_{2'}$ are dependent upon the frequency shift of the Brillouin diffracting grating in the dual-Brillouin-peak optical fiber 112.

In an embodiment, the first reflected wavelength $\lambda_{1'}$ is similar to the first wavelength $\lambda_1$ and the second reflected wavelength $\lambda_{2'}$ is equal to the second reflected wavelength $\lambda_2$. In another embodiment, the first reflected wavelength $\lambda_{1'}$ is different from the first wavelength $\lambda_1$ and the second reflected wavelength $\lambda_{2'}$ is different from the second reflected wavelength $\lambda_2$. In yet another embodiment, the first reflected wavelength $\lambda_{1'}$ is smaller than the first wavelength $\lambda_1$ and the second reflected wavelength $\lambda_{2'}$ is smaller than the second reflected wavelength $\lambda_2$.

In an embodiment, the first wavelength $\lambda_1$ is from 400 to 2000 nanometers, while the second wavelength $\lambda_2$ is from 400 to 2000 nanometers. In an embodiment, the first reflected wavelength $\lambda_{1'}$ is from 1520 to 1580 nanometers, while the second reflected wavelength $\lambda_{2'}$ is from 1570 to 1635 nanometers.

The following description is related to the composition and performance of the dual-Brillouin peak optical fiber 112. Using a single fiber with a suitable dopant profile offers a simple and effective method to produce a Brillouin-peak optical fiber. To achieve low measurement uncertainties, the separation of the two peaks in Brillouin frequency needs to be sufficiently large. In addition, the temperature or strain coefficients of the frequency shift for the peaks are significantly different and the peak intensities of any two peaks need to be comparable. In an embodiment, the frequency difference between any two Brillouin peaks is greater than 0.2 gigahertz (GHz), preferably 0.3 to 2 GHz, and preferably 0.35 to 1 GHz. Frequency differences greater than 2 GHz are also acceptable.

Ratios of peak intensities between the intensity one of the other scattering peaks (the secondary, the tertiary, the quarternary peak, and the like) to that of the primary scattering peak should be greater than 0.4, preferably greater than 0.5, preferably greater than 0.75, preferably greater than 0.8, and more preferably greater than 0.9. In an embodiment, ratios of peak intensities between the intensity one of the other scattering peaks (the secondary, the tertiary, the quarternary peak, and the like) to that of the primary scattering peak is preferably 0.95 to 1.0.

In an embodiment, the single mode or few-mode core is doped with two or more dopants. Each dopant comprises a different doping element. In an embodiment, the core is doped with a plurality of dopants. One of the dopants (a first dopant that produces a first dopant concentration profile) increases the refractive index of the core above that of its base refractive index, while the other dopant (a second dopant that produces a second dopant concentration profile) decreases the refractive index of the core below that of its base refractive index. Combinations of dopants that increase the refractive index with those that decrease the refractive index relative to the refractive index of the core may also be used to create the first dopant concentration profile and/or the second dopant concentration profile.

The concentration profile for the first dopant and the second dopant is controlled to increase the interaction between the interaction of a fundamental optical mode at a given wavelength with a plurality of acoustic modes thereby increasing a ratio of Brillouin Scattering intensity of a secondary, tertiary, quarternary peak to the Brillouin Scattering intensity of a primary peak in a Brillouin Scattering spectrum at a given wavelength.

In an embodiment, the core preferably comprises silica. In the case of silica fibers, typical index-raising dopants are germania ($GeO_2$, germanosilicate fibers), phosphorus pentoxide ($P_2O_5$, phosphosilicate), titania ($TiO_2$), alumina ($Al_2O_3$, aluminosilicate), or a combination thereof. Alternatively, or in addition, the index of the cladding may be lowered e.g., by using fluorine, boron oxide ($B_2O_3$) dopants, or a combination thereof. Index-lowering dopants can also be used in the core if other desired dopants make the refractive index difference too high.

Figure 3A:
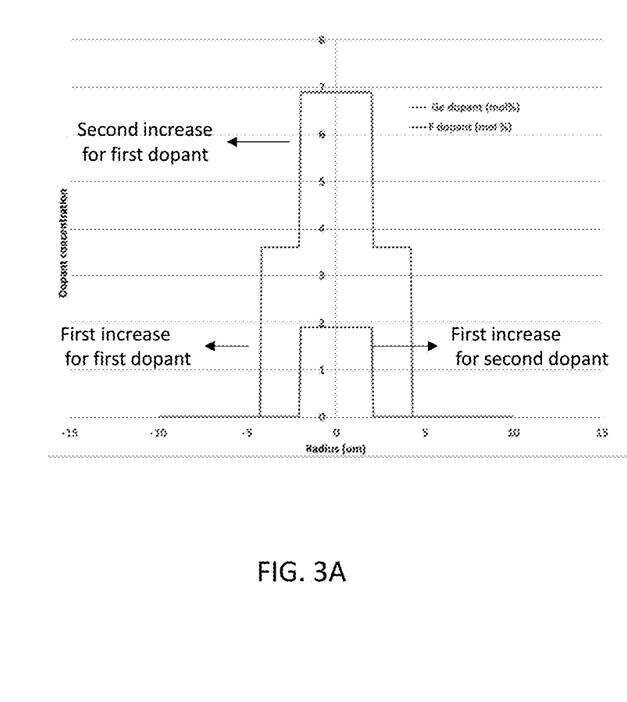
FIG. 3A reflects an exemplary dopant concentration profile of a desired optical fiber that has multiple peaks of comparable intensity.
Figure 3B:
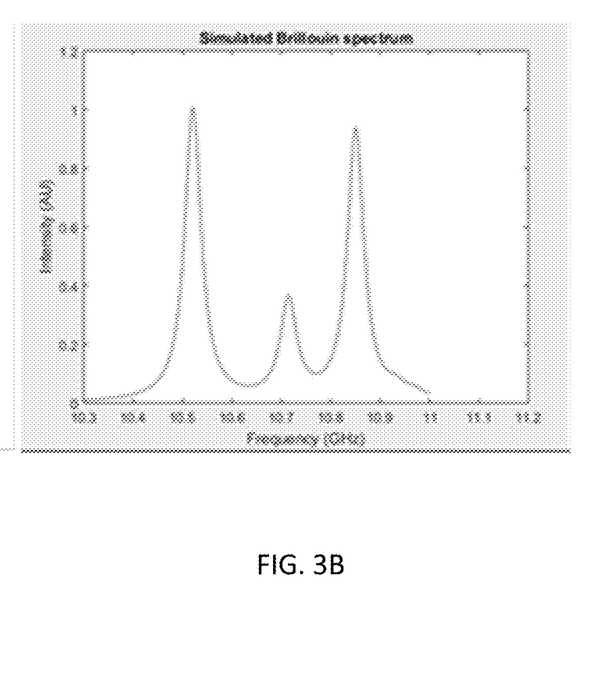
FIG. 3B depicts a simulated Brillouin scattering spectrum which indicates the existence of a third peak (also known as a tertiary peak) located sufficiently away from the main peak and of a comparable intensity.

The FIG. 3A reflects an exemplary dopant concentration profile of a desired optical fiber that has multiple peaks of comparable intensity. Both germania and fluorine dopant concentration profiles are indicated (for germanium and fluorine respectively) in the FIG. 2A. In the FIG. 3A, the goal of the design in the FIG. 3A is to maintain its single mode operation optically at 1550 nm while allowing for a greater overlap of the fundamental optical mode with higher order acoustic modes. FIG. 3B depicts a simulated Brillouin scattering spectrum which indicates the existence of a third peak (also known as a tertiary peak) located sufficiently away from the main peak and of a comparable intensity.

The measured Brillouin spectrum of an experimental optical fiber with the designed dopant profiles as shown in FIG. 3A exhibiting a strong peak located a frequency greater than 10.8 GHz with an intensity about 97% of that of the main peak, is shown in FIG. 3A.

As can be seen in the exemplary depiction of the FIG. 3A, the dopant concentration includes a step function. The step function is an abrupt increase or decrease in the dopant concentration in the radial direction of the core. The dopants used to achieve the desired characteristics for the core may include a first dopant that increases the refractive index above that of the core refractive index and a second dopant that decreases the refractive index below that of the core refractive index. The dopant concentration of each of the dopants is symmetrical about a longitudinal axis of the core.

For the first dopant (e.g., the first dopant that increases the refractive index above that of the core refractive index), the concentration at the outer radius of the core is generally zero. At 25% to 75% of the radius (measured from the centerline of the core), the dopant concentration first increases (the first increase) abruptly to a desired value. The dopant concentration may then remain constant as the radius decreases. After remaining constant in the radial direction, the dopant concentration may once again increase abruptly (the second increase) at 20% to 60% of the radius (measured from the centerline of the core), or alternatively, it may decrease (the first decrease) abruptly till the centerline of the core. The centerline of the core is also referred to as the longitudinal axis.

The first increase in first dopant concentration may be 20 to 70%, preferably 30 to 60% of the total molar concentration of the first dopant in the core. The second increase in first dopant concentration may be 30 to 80%, preferably 40 to 70% of the total molar concentration of the first dopant in the core. The first decrease in first dopant concentration may be 25 to 65%, preferably 35 to 55% of the total molar concentration of the first dopant in the core.

For the second dopant, (e.g., the second dopant that decreases the refractive index below that of the core refractive index) the concentration of the dopant is zero from the outer circumference of the core to a point located 10 to 50% of the core radius (measured from the centerline). The concentration of the dopant may remain constant till the centerline of the core is reached. The first increase in second dopant concentration may be 5 to 50%, preferably 10 to 40% of the total molar concentration of the second dopant in the core.

Figure 4:
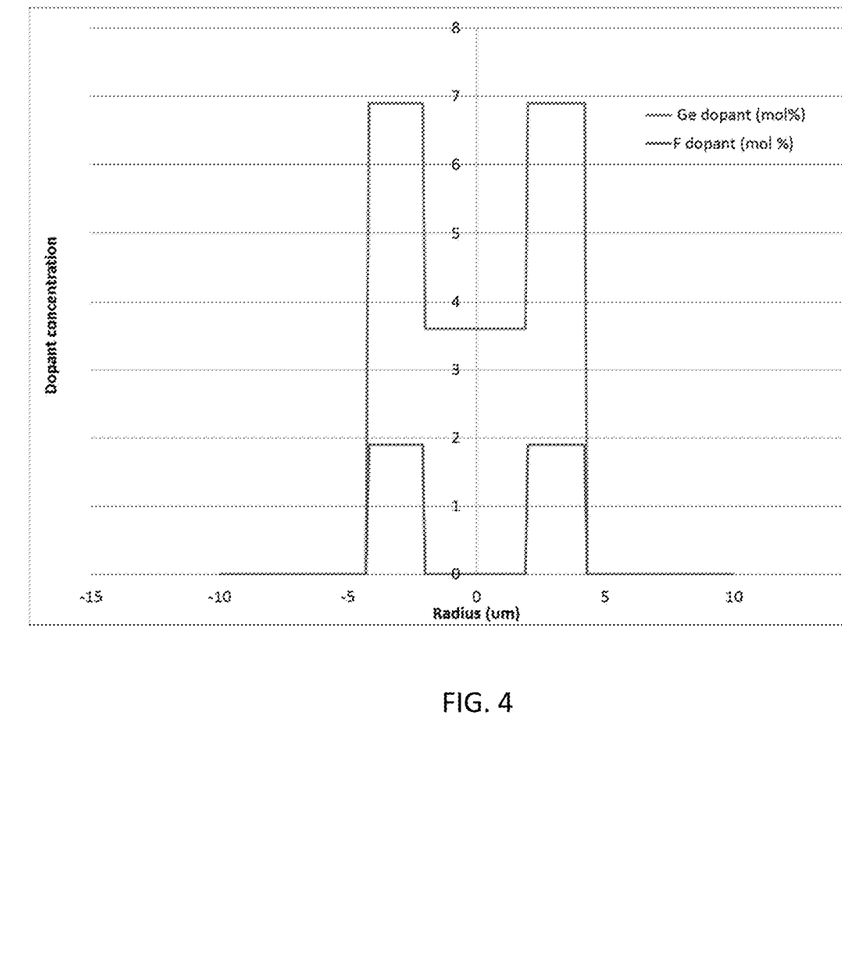
FIG. 4 depicts another dopant profile for the plurality of dopants that may be used in the core to produce an optical fiber that can be used as a sensor for both temperature and strain.

While the FIG. 3A shows only two increases in the first dopant concentration and one increase for the second dopant concentration, it is possible to have multiple increases and decreases in concentration for the dopants. FIG. 4 shows another dopant profile for the plurality of dopants that may be used in the core to produce an optical fiber that can be used as a sensor for both temperature and strain. As may be seen in the FIG. 4, the first dopant and the second dopant have concentration profiles in the core that include two or more abrupt increases and two or more abrupt decreases. In an embodiment, the first dopant and the second dopant have concentration profiles in the core that include three or more abrupt increases and three or more abrupt decreases, preferably four or more abrupt increases and four or more abrupt decreases, preferably five or more abrupt increases and five or more abrupt decreases.

With regard to the FIG. 3A, an optical fiber manufactured with the actual dopant profile shown in the figure has a Brillouin scattering peak depicted in the graph in the FIG. 3B. The simulated spectrum, FIG. 3B indicated the existence of a third peak located sufficiently away from the main peak and with a comparable intensity. The measured Brillouin spectrum of an experimental optical fiber with the designed dopant profiles as shown in FIG. 3A exhibiting a strong peak located a frequency greater than 10.9 GHz with an intensity about 97% of that of the main peak, is shown in FIG. 3.

The optical fibers described above may be fabricated using any of a variety of optical fiber manufacturing techniques, for example, Outside Vapor Deposition (OVD), Chemical Vapor Deposition (CVD), Modified Chemical Vapor Deposition (MCVD), Vapor Axial Deposition (VAD), Plasma enhanced CVD (PCVD), or the like, or a combination thereof.

In one embodiment, in one manner of manufacturing the disclosed optical fibers (the dual-Brillouin-peak optical fiber), a glass tube having an inside wall and an outside wall is heated to a temperature between 1100+C. and 1300° C. A plurality of reactive gases (that contain the respective dopants in the desired dopant molar ratio) is passed through the glass tube at a pressure between 1 and 30 hectopascals. The reactive gases are introduced into the tube at a gas inlet end of the glass tube. A non-isothermal plasma is formed inside the tube to react the gas mixture.

In an embodiment, it is desirable for the optical fiber to display at three Brillouin scattering peaks, the first and second peak have same temperature response, e. g., the temperature coefficient difference of the first and second peak is less than 0.01 MHz/° C., while the first and third peak have a different temperature response and the temperature coefficient difference between the first and third peak is greater 0.05 MHz/° C.

In an embodiment, in order to obtain to obtain an optical fiber with multiple Brillouin scattering peaks, it is desirable to use a silica or quartz core that is doped with chlorine, fluorine and germanium.

In one embodiment, the optical fiber that can produce multiple Brillouin scattering peaks comprises a plurality of dopant concentration profiles in a core of the optical fiber. The plurality of dopant concentration profiles comprises a first dopant concentration profile and a second dopant concentration profile, where the first dopant concentration profile is obtained from a first dopant that increases the refractive index of the core above its base refractive index and the second dopant concentration profile is obtained from a second dopant that decreases the refractive index of the core below its base refractive index.

The first dopant concentration and the second dopant concentration are each varied in a stepwise manner. A ratio of the first dopant concentration to the second dopant concentration is operative to result in an interaction of a fundamental optical mode at a given wavelength with a plurality of acoustic modes. This increases a ratio of Brillouin scattering intensity of a secondary, tertiary or quarternary peak relative to a Brillouin Scattering intensity of a primary peak to be greater than 0.4 in a Brillouin Scattering spectrum.

In one embodiment, the first dopant comprises chlorine and germanium, while the second dopant comprises germanium. In another embodiment, the first dopant comprises a combination of chlorine, fluorine and germanium, while the second dopant comprises germanium. In yet another embodiment, the first dopant comprises germanium, while the second dopant comprises chlorine, fluorine and germanium dopants. In yet another embodiment, the first dopant comprises germanium, while the second dopant comprises chlorine and germanium. In yet another embodiment, the first dopant comprises chlorine and germanium, while the second dopant comprises germanium and fluorine. In yet another embodiment, the first dopant comprises fluorine and germanium, while the second dopant comprises germanium and chlorine.

In one embodiment, the inner core is doped with a combination of chlorine and germanium, while the outer core is doped with germanium. In another embodiment, the inner core is doped with a combination of chlorine, fluorine and germanium, while the outer core is doped with germanium. In another embodiment, the inner core is doped with just germanium, while the outer core contains chlorine, fluorine and germanium dopants. In yet another embodiment, the inner core is doped with just germanium, while the outer core is doped with chlorine and germanium. In yet another embodiment, the inner core is doped with a combination of chlorine and germanium, while the outer core is doped with a combination of germanium and fluorine. In yet another embodiment, the inner core is doped with a combination of fluorine and germanium, while the outer core is doped with a combination of germanium and chlorine.

The device disclosed herein can be advantageously used to generate a Brillouin dynamic grating with an enhanced back-reflection using a first light beam and a second light beam of different wavelengths. Since the two beams have a high overlap, the Brillouin diffraction grating produces a large amount of reflection. This can be used for high resolution and high accuracy temperature and strain sensing because of the increased back-scattered signal and thus a higher signal to noise ratio (SNR).

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An apparatus comprising:
a first source of light having a first wavelength $\lambda_1$;
a second source of light having a second wavelength $\lambda_2$; wherein $\lambda_2$ is different from $\lambda_1$;
a wavelength divisional multiplexer that is operative to combine light received from the first source of light and from the second source; wherein the combined light transmits at a third wavelength $\lambda_3$ that is different from first wavelength $\lambda_1$ and the second wavelength $\lambda_2$;
a dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects a back-reflected Brillouin signal of the combined light; and
a demultiplexer that splits the back-reflected Brillouin signal into light having a first reflected wavelength of $\lambda_{1'}$ and a second reflected wavelength of $\lambda_{2'}$, wherein the first reflected wavelength of $\lambda_{1'}$ is equal to the first wavelength $\lambda_1$ and wherein the second reflected wavelength of $\lambda_{2'}$ is equal to the second wavelength $\lambda_2$.

2. The apparatus of claim 1, further comprising a first optical coupler and a second optical coupler that are operative to receive light from the first source of light and from the second source of light respectively.

3. The apparatus of claim 2, wherein the first optical coupler splits an incident beam of light into a first light stream and a second light stream in a ratio of 10% to 1%:90% to 99%.

4. The apparatus of claim 2, wherein the second optical coupler splits an incident beam of light into a first light stream and a second light stream in a ratio of 10% to 1%:90% to 99%.

5. The apparatus of claim 1, wherein light from the first source and light from the second source have wavelengths that have wavelengths from 400 to 2100 nanometers.

6. The apparatus of claim 1, wherein a wavelength ratio of the first wavelength $\lambda_1$ to the second wavelength $\lambda_2$ is proportional to the Brillouin frequency shifts of a first peak $v_{B,1}$ and a second peak $v_{B,2}$ respectively in the Brillouin spectrum of the dual-Brillouin peak optical fiber as seen in the Formula (2)

$$\frac{\lambda_2}{\lambda_1} \sim = \frac{v_{B,2}}{v_{B,1}}. \qquad (2)$$

7. The apparatus of claim 1, wherein the dual-Brillouin peak optical fiber has a Brillouin gain spectrum that has multiple peaks with at least two of the peaks having similar intensities.

8. The apparatus of claim 1, wherein the first source of light and the second source of light are laser generated sources.

9. An apparatus comprising:
a first source of light having a first wavelength $\lambda_1$;
a second source of light having a second wavelength $\lambda_2$; wherein $\lambda_2$ is different from $\lambda_1$;
a wavelength divisional multiplexer that is operative to combine light received from the first source of light and from the second source; wherein the combined light transmits at a third wavelength $\lambda_3$ that is different from first wavelength $\lambda_1$ and the second wavelength $\lambda_2$;
a dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects a back-reflected Brillouin signal of the combined light; and
a demultiplexer that splits the back-reflected Brillouin signal into light having a first reflected wavelength of $\lambda_{1'}$ and a second reflected wavelength of $\lambda_{2'}$, wherein the first reflected wavelength of $\lambda_{1'}$ is shorter than the first wavelength $\lambda_1$ and wherein the second reflected wavelength of $\lambda_{2'}$ is shorter than the second wavelength $\lambda_2$.

10. The apparatus of claim 9, further comprising a first optical coupler and a second optical coupler that are operative to receive light from the first source of light and from the second source of light respectively.

11. The apparatus of claim 10, wherein the first optical coupler splits an incident beam of light into a first light stream and a second light stream in a ratio of 10% to 1%:90% to 99%.

12. The apparatus of claim 10, wherein the second optical coupler splits an incident beam of light into a first light stream and a second light stream in a ratio of 10% to 1%:90% to 99%.

13. The apparatus of claim 9, wherein light from the first source and light from the second source have wavelengths that have wavelengths from 400 to 2100 nanometers.

14. The apparatus of claim 9, wherein a wavelength ratio of the first wavelength $\lambda_1$ to the second wavelength $\lambda_2$ is proportional to the Brillouin frequency shifts of a first peak $v_{B,1}$ and a second peak $v_{B,2}$ respectively in the Brillouin spectrum of the dual-Brillouin peak optical fiber as seen in the Formula (2)

$$\frac{\lambda_2}{\lambda_1} \sim = \frac{v_{B,2}}{v_{B,1}}.$$

15. The apparatus of claim 9, wherein the dual-Brillouin peak optical fiber has a Brillouin gain spectrum that has multiple peaks with at least two of the peaks having similar intensities.

16. The apparatus of claim 9, wherein the first source of light and the second source of light are laser generated sources.

17. A method comprising:
  injecting light of a first wavelength $\lambda_1$ into a wavelength division multiplexer;
  injecting light of a second wavelength $\lambda_2$ into the wavelength division multiplexer;
  combining the light of the first wavelength $\lambda_1$ and the light of the second wavelength $\lambda_2$ in the wavelength division multiplexer such that the combined light transmits at a third wavelength $\lambda_3$;
  reflecting the light of the third wavelength $\lambda_3$ in a dual-Brillouin peak optical fiber that is in communication with the wavelength divisional multiplexer; wherein the dual-Brillouin peak optical fiber has at least two Brillouin peaks, such that an amplitude $A_1$ of at least one of said Brillouin peaks is within 50% to 150% of an amplitude $A_2$ of another Brillouin peak $0.5A_2 \leq A_1 \leq 1.5A_2$; wherein the dual-Brillouin peak optical fiber generates a Brillouin dynamic grating that reflects a back-reflected Brillouin signal of the combined light; and
  splitting the back-reflected Brillouin signal into light having a first reflected wavelength of $\lambda_{1'}$ and a second reflected wavelength of $\lambda_{2'}$, wherein one of:
    a) $\lambda_{1'}$ equals $\lambda_1$ and $\lambda_{2'}$ equals $\lambda_2$, or
    b) $\lambda_{1'}$ is shorter than $\lambda_1$ and $\lambda_{2'}$ is shorter than $\lambda_2$.

18. The method of claim 17, further comprising
  receiving light at a first optical coupler from the first source of light, wherein the first optical coupler splits an incident beam of light into a first light stream and a second light stream in a ratio of 10% to 1%:90% to 99%; and
  receiving light at a second optical coupler from the second source of light, wherein the second optical coupler splits an incident beam of light into a first light stream and a second light stream in a ratio of 10% to 1%:90% to 99%.

19. The method of claim 17, wherein light from the first source and light from the second source have wavelengths that have wavelengths from 400 to 2100 nanometers.

20. The method of claim 17, wherein a wavelength ratio of the first wavelength $\lambda_1$ to the second wavelength $\lambda_2$ is proportional to the Brillouin frequency shifts of a first peak $v_{B,1}$ and a second peak $v_{B,2}$ respectively in the Brillouin spectrum of the dual-Brillouin peak optical fiber as seen in the Formula (2)

$$\frac{\lambda_2}{\lambda_1} \sim = \frac{v_{B,2}}{v_{B,1}}.$$

* * * * *